United States Patent Office 3,169,068
Patented Feb. 9, 1965

3,169,068
PRESERVATIVE OF OXYGEN-LABILE
SUBSTANCES, E.G., FOODS
Felix Bloch, Oakland, Calif., assignor to the United States of America as represented by the Secretary of Agriculture
No Drawing. Filed Sept. 12, 1962, Ser. No. 223,280
6 Claims. (Cl. 99—171)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention generally relates to the preservation of foods and other substances which are adversely affected by contact with free oxygen. An object of the invention is the provision of novel compositions of matter useful as oxygen scavengers. The objects of the invention also include methods applying these novel compositions of matter in protecting substances from the deleterious action of free oxygen. Further objects of the invention will be evident from the following description wherein parts and percentages are by weight unless otherwise specified.

It is well known that many substances are adversely affected by contact with free oxygen. Typical examples of such substances are dehydrated eggs, dehydrated whole milk, dehydrated potatoes, edible fats and oils, nuts, and the like. If such products are stored in an atmosphere containing free oxygen, various deteriorative reactions take place leading to development of undesirable color, flavor, and odor. Typical of the reactions which take place is oxidation of fat components leading to the formation of compounds which have a characteristic rancid odor and taste.

In view of the above consideration it is desirable to provide means whereby oxidation-labile substances can be protected from contact with free oxygen so that they will retain their original qualities over long storage periods. The oxygen scavengers of the present invention provide the means whereby this goal may be effectively attained. The oxygen scavengers herein described have an unusual ability to absorb oxygen. Thus, when they are placed in contact with air or other atmosphere containing free oxygen they rapidly absorb the oxygen by chemically combining with it, thus effectively de-oxygenating the atmosphere. Because of this oxygen-absorbing ability, the scavengers are useful for the preservation of all types of substances which are adversely affected by free oxygen. A typical manner of employing the scavengers of the invention for such purpose is as follows:

The substance to be preserved—dehydrated potato, for example—is placed in a conventional container such as a can. A suitable quantity of the scavenger, enclosed in a porous receptacle such as a paper or cloth bag, is then placed in the can. The can is then sealed in the customary manner. Naturally, besides the potato and scavenger the can will contain air, the latter localized in the headspace and intermingled with the potato particles. As the can is stored following sealing, the scavenger will absorb the oxygen from this air whereby the potato product will retain its original color, flavor, and odor over long storage periods.

A particularly desirable property of the scavengers of the invention is that they are operative at low temperatures such as those encountered in normal refrigeration practice. As a result, food products can be de-oxygenated while held under refrigeration. This ability of the scavenger of the invention to function at low temperatures is in contrast to the enzyme preparations (such as glucose oxidase) advocated for removing free oxygen from containers of food. Since such enzyme preparations depend on biochemical reactions for their effectiveness they are markedly affected by temperature and exhibit a very low oxygen absorption rate at refrigeration temperatures.

Another desirable characteristic of the scavengers of the invention is that they are effective in systems containing desiccating agents. In the packaging of dehydrated food products it is often desirable to add a packet of a desiccant to the container to remove residual moisture from the food product during storage. By applying the principles of the present invention, one may package dried foods wtih both a desiccant and with the scavenger since the scavengers are effective even in systems containing desiccating agents.

The scavengers of the invention contain as their basic ingredient a bisulphite, that is, a salt containing the anion —$HSO_3^-$. The cation to which the bisulphite radical is attached is of no concern since the essential requisite is the bisulphite moiety of the salt. Ordinarily, sodium bisulphite is used as it is an inexpensive and efficient source of the desired anion. However, other salts such as calcium, potassium, magnesium, ferrous, ferric, aluminum, zinc, and other metal bisulphites may be used.

The absorption of oxygen by the scavenger is believed to involve the following reaction:

$$^-HSO_3 + \tfrac{1}{2}O_2 \rightarrow {}^-HSO_4$$

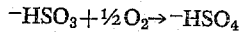

Thus a molecule of the bisulphite takes up an atom of oxygen, forming a bisulphate. This relationship furnishes a convenient basis on which one may determine how much of the scavenger is required in any particular situation. Thus, the minimum amount of scavenger is that which will furnish one mole of $HSO_3^-$ per each half-mole of oxygen in the container to be rendered oxygen-free. Generally, to ensure complete and accelerated oxygen removal, the scavenger is used in an amount to furnish the bisulphite ion in excess, for example, at least 1.5 moles of $HSO_3^-$ per half-mole of oxygen.

Ordinarily, the bisulphite ingredient of the scavenger is provided directly by use of such compound. However, the equivalent effect may be produced by providing a sulphite plus an acid, typically a mixture of sodium sulphite or calcium sulphite plus sulphuric, phosphoric, lactic, or other acid. Also, the so-called meta-bisulphites or anhydrous bisulphites, such as $Na_2S_2O_5$, may be used instead of regular bisulphites.

It is to be noted that a bisulphite by itself will not absorb oxygen to any practical extent and it is necessary to supplement it to form a composition which will enable the absorption of oxygen at a useful rate. Thus in accordance with the invention, the bisulphite is increased in surface area by incorporating with it a carrier having an extended surface area. Typical of the carriers which may be used are charcoal, activated carbon, alumina, silica gel, pumice, or other conventional inert material which provides a large surface area. In addition, to further increase the effectiveness of the composition there is preferably provided an activator. This activator may comprise one or more of the following types of materials:

(a) A heavy metal, as for example, iron, manganese, copper, nickel, vanadium, molybdenum, or the like. The heavy metal may be employed in elemental form or in the form of an oxide or a salt. Thus typically one may employ the metals themselves or their oxides, sulphates, chlorides, nitrates, or phosphates. Preferred agents because of their effectiveness and low cost are the salts of iron, typically iron chlorides or sulphates. In an especially preferred embodiment of the invention, the iron salt is used in admixture with an iron oxide. Such mixtures are readily prepared by applying a solution of an iron salt such as ferric sulphate, ferrous sulphate, ferric chloride, or ferrous chloride to a carrier having extended surface and then drying the material. During the drying step, the iron salt is partially decomposed to the oxide.

(b) A peroxide. Generally hydrogen peroxide solution is used as being inexpensive and effective. However, other peroxides may be employed as, for example, sodium peroxide, calcium peroxide, benzoyl peroxide, acetyl peroxide, t-butyl hydroperoxide, urea peroxide, or the like.

(c) In the event that the various components of the scavenger are essentially anhydrous, it is desirable to moisten the composition with a small proportion of water. In the event that the components contain water of crystallization or other water content, it is usually not necessary to add additional moisture.

An especially preferred embodiment of the scavenger which provides a high rate of oxygen absorption contains, in addition to sodium bisulphite, the following ingredients:

(1) Activated carbon in a proportion of 0.5 to 10 parts, preferably 2.5 parts, per part of sodium bisulphite.

(2) A mixture of ferric chloride and ferric oxide in a proportion of 0.01 to 1 part per part of sodium bisulphite.

(3) Hydrogen peroxide in a proportion of 0.02 to 0.2 part per part of sodium bisulphite.

(4) Water (including that present in the other ingredients) in a proportion of 0.3 to 5 parts per part of sodium bisulphite.

The scavengers of the invention may be utilized in preserving all kinds of materials which are normally subject to being adversely affected by contact with free oxygen. Typical examples of such materials, given merely by way of illustration and not limitation, are dried fruits, dried vegetables, dried eggs, dried milk, dried fruit or vegetable juices, nuts, cereals, edible fats and oils, butter, margarine, bacon, ham, smoked or dried fish products, dried meats, bread, crackers, and other bakery products, cheeses, etc. Generally, it is preferred that the scavenger be out of physical contact with the material to be preserved but in oxygen-absorptive relationship with the material and the atmosphere within the container. This goal is readily achieved by enclosing the scavenger in a receptacle through which gases can diffuse. Typical receptacles for such purposes are bags made of porous paper or cloth or metal receptacles provided with a "window" of paper, cloth, or perforated metal. In packaging products in accordance with the invention, the material to be preserved is filled into a container, the packet of scavenger is added and the container is then sealed. If the material to be preserved is a dehydrated product which requires further dehydration during storage, a conventional desiccant packet such as an envelope of gas-permeable material containing calcium oxide may be added with the other items prior to sealing. When the packages so prepared are stored, oxygen is removed by chemical combination with the activated bisulphite in the scavenger. The removal of oxygen does not occur instantaneously, the rate of oxygen removal being rapid at first and diminishing as the residual amount of oxygen is decreased. However, since the oxidative reactions to which the packaged material is susceptible are likewise not instantaneous, the fact that oxygen removal does not take place at once does not belie the advantage of using the scavenger. Indeed by using the scavenger, the oxygen is removed at a rate faster than that involved in the deterioration of the material to be preserved.

It is obvious that when the scavengers of the invention are employed in a sealed container, the pressure in the container will be reduced as oxygen is removed from the atmosphere therein. In some cases it may be preferred to avoid this pressure reduction. For example, where the package is made up of plastic sheet material or metal foil, it may be preferred to retain the original size and plumpness of the package. In such event one may incorporate with the scavenger composition a carbonate such as sodium carbonate or preferably sodium bicarbonate. As oxygen is taken up by the bisulphite forming the bisulphate ion, this latter stronger anion will liberate carbon dioxide from the added carbonate, replacing the absorbed oxygen by released carbon dioxide and maintaining the pressure in the container approximately constant. Another aspect of the invention concerns the utilization of the aforesaid scavenger compositions containing a carbonate in order to provide atmospheres of a controlled composition. For example, the amount of bisulphite in the scavenger may be less than that required to remove all the oxygen, resulting in an atmosphere containing a reduced proportion of oxygen plus carbon dioxide released from the scavenger composition. Such atmospheres are often desirable in storage of fresh vegetable materials such as lettuce, cabbage, or other fresh leafy produce.

The invention is further demonstrated by the following illustrative examples:

*Example I*

A. Five hundred and forty milligrams of $FeCl_3 \cdot 6H_2O$, 20 grams of activated carbon (12 x 20 mesh), and 40 ml. of water were mixed. The mixture was then dried in an oven at 106–107° C. The product contained a mixture of ferric chloride and ferric oxide on activated carbon.

B. One gram of sodium bisulphite, 2.56 grams of the material prepared in part A, and 1.25 ml. of 3% hydrogen peroxide solution were mixed, thus forming a scavenger composition.

C. The scavenger of part B was tested in the following manner: The scavenger was placed in a glass bottle connected to a manometer. The total contents of the bottle were the scavenger plus the air in the system which was calculated to have a volume of 300 cc. The system was sealed and held at room temperature (about 24° C.). From time to time the degree of vacuum created within the system was measured and from these figures the proportion of oxygen removed was determined. The results are tabulated below:

| Time, min. | Vacuum, mm. of Hg | Oxygen removed, percent |
| --- | --- | --- |
| 0 | | None |
| 10 | 46 | 29 |
| 20 | 68 | 43 |
| 30 | 81 | 51 |
| 60 | 103 | 64 |
| 90 | 116 | 73 |
| 120 | 125 | 78 |
| 180 | 137 | 86 |
| 240 | 145 | 91 |
| 300 | 150 | 94 |
| 900 | 160 | 100 |

*Example II*

Two and one-half grams of the ferric chloride-ferric oxide-carbon composition of Example I, Part A, was mixed with 1 gram of sodium bisulphite, 0.1 gram of calcium peroxide, and 1 ml. of lactic acid diluted 1 to 1 with water. The resulting scavenger was tested as described in Example I, Part C. It was found that 50% of the oxygen was absorbed in 3 hours and 100% of the oxygen absorbed in 4 days.

*Example III*

Five grams of the ferric chloride-ferric oxide-carbon composition of Example I, Part A, was mixed with 2 grams of sodium bisulphite and 2.5 ml. of 3% hydrogen peroxide solution. The resulting scavenger was tested as described in Example I, Part C. It was found that 50% of the oxygen was absorbed in less than 10 minutes and 100% of the oxygen was absorbed in 90 minutes.

*Example IV*

Two and five-tenths grams of the ferric chloride-ferric oxide-carbon composition of Example I, Part A, was mixed with 1 gram of sodium bisulphite and 1.2 ml. of 7.5% hydrogen peroxide.

The resulting scavenger was tested as described in Example I, Part C, with the following change: The system was kept in a refrigerator at 36° F. It was found that 50% of the oxygen was absorbed in 90 minutes and 100% of the oxygen was absorbed in 36 hours.

*Example V*

Five and six-tenths of grams of the ferric chloride-ferric oxide-carbon composition of Example I, Part A, was mixed with 2.2 grams of sodium bisulphite and 2.75 ml. of 3% hydrogen peroxide solution.

The resulting scavenger was tested as described in Example I, Part C, but with these changes: (*a*) The test system contained 650 ml. of air; (*b*) the test system also contained a conventional desiccant packet containing 20 grams of calcium oxide. The desiccant was added to test the efficacy of the scavenger in the presence of a desiccating agent. It was found that 50% of the oxygen was absorbed in 35 minutes and 100% of the oxygen was removed in 20 hours.

*Example VI*

A mixture was prepared containing the following ingredients:

| | Grams |
|---|---|
| Activated carbon | 5 |
| Sodium metabisulphite | 1 |
| Sodium bicarbonate | 0.84 |
| $H_2O$ | 0.5 |

The above mixture was sealed in a glass vessel containing 320 ml. of air. After standing 24 hours at room temperature, the atmosphere in the vessel was analyzed. The results are tabulated below.

| Gas: | Percent by volume |
|---|---|
| $CO_2$ | 13.7 |
| $O_2$ | 6.0 |
| $N_2$ | 80.3 |

Having thus defined the invention, what is claimed is:

1. An oxygen scavenger composition comprising a bisulphite, an inert carrier having an extended surface, and a peroxide, said inert carrier and peroxide being present in amount effective to accelerate absorption of oxygen by the bisulphite.

2. An oxygen scavenger comprising sodium bisulphite, an inert carrier having an extended surface, an iron salt, and a peroxide, said inert carrier, iron salt, and peroxide being present in amount effective to accelerate absorption of oxygen by the said bisulphite.

3. A method of preserving a material which is adversely affected by contact with free oxygen which comprises sealing the material in a container together with the scavenger composition defined in claim 1.

4. A method of preserving a material which is adversely affected by contact with free oxygen which comprises sealing the material in a container together with the scavenger composition defined in claim 2.

5. An oxygen scavenger composition comprising a bisulphite, activated carbon in an amount effective to accelerate absorption of oxygen by said bisulphite, and a carbonate in an amount effective to liberate carbon dioxide.

6. An oxygen scavenger comprising a bisulphite, an inert carrier having an extended surface, a peroxide, and a carbonate, said inert carrier and peroxide being present in amount effective to accelerate absorption of oxygen by the bisulphite, said carbonate being present in amount effective to liberate carbon dioxide.

References Cited by the Examiner

UNITED STATES PATENTS

| 907,180 | 12/08 | Ryder et al. | 252—188 |
|---|---|---|---|
| 2,825,651 | 3/58 | Loo et al. | 99—171 |
| 2,971,851 | 2/61 | Kurtz | 99—171 |
| 3,016,336 | 1/62 | Scott et al. | 195—63 |

OTHER REFERENCES

The Merck Index, 7th ed., 1960, pp. 946 and 963, RS 356 M524.

A. LOUIS MONACELL, *Primary Examiner*.